(12) United States Patent
Howard

(10) Patent No.: US 7,225,553 B1
(45) Date of Patent: Jun. 5, 2007

(54) GRADIOMETER MOUNTING AND ISOLATION SYSTEM

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/346,436

(22) Filed: Feb. 3, 2006

(51) Int. Cl.
*G01C 9/06* (2006.01)
(52) U.S. Cl. .................................. 33/366.13
(58) Field of Classification Search .............. 33/366.13
See application file for complete search history.

(56) References Cited

U.S. PATENT DOCUMENTS

| | | | | |
|---|---|---|---|---|
| 4,344,235 A | * | 8/1982 | Flanders | 33/366.12 |
| 4,707,927 A | * | 11/1987 | Hiyama | 33/366.19 |
| 5,668,315 A | * | 9/1997 | Van Kann et al. | 73/382 G |
| 6,148,669 A | * | 11/2000 | Roest | 33/366.25 |
| 6,301,795 B1 | * | 10/2001 | Kang | 33/366.12 |
| 7,137,208 B2 | * | 11/2006 | Campbell et al. | 33/366.13 |

* cited by examiner

*Primary Examiner*—Christopher W. Fulton
(74) *Attorney, Agent, or Firm*—Mark A. Wurm; David D'Zurilla

(57) ABSTRACT

An apparatus for maintaining the orientation of an instrument or other object in one embodiment includes an inner shell of ferromagnetic material. An outer shell surrounds the inner shell, and one or more electromagnets are attached to the inner surface of said outer shell. The powering of the electromagnets creates eddy currents in the inner shell, which create torques that orient and re-orient the position of the inner shell. In another embodiment, the outer shell has a plurality of ports that are supplied with a gas. Some ports function to levitate the inner shell, and other ports function to orient and re-orient the inner shell.

26 Claims, 9 Drawing Sheets

GRADIOMETER MOUNTING AND ISOLATION SYSTEM

TECHNICAL FIELD

Various embodiments relate to gradiometers, and in an embodiment, but not by way of limitation, to mounting and isolation systems for gradiometers.

BACKGROUND

Gradiometers are insensitive to bulk field values—at least to a first approximation. This behavior results from the fact that a gradiometer measures either a gradient of a field or a proxy of a gradient. For example, some gradiometers determine a gradient by approximating the first derivative. That is, with the first derivative represented as:

$$f'(x)=[f(x)+f(x+\Delta x)]/\Delta x$$

the gradient is determined from the values of the function at $f(x)$ and $f(x+\Delta x)$. However, while gradiometers are relatively insensitive to bulk field values, they remain sensitive to rotations. This rotational sensitivity can be compensated for with a five axis device if the directional gradient is assumed fixed in space. However, such an assumption may result in the masking of the effect one desires to detect with the gradiometer.

Gravity gradiometers in particular are sensitive to angular acceleration and angular rotation. The exact sensitivity to angular acceleration depends on a gravity gradiometer's design, sensing modality, and the spatial extent over which the gradient measurement is made. As illustrated in FIG. 1, the forces $F_1$ and $F_2$ on masses $m_1$ and $m_2$ depend on the masses $m_1$ and $m_2$, the square of the angular rotation rates $\omega_1^2$ and $\omega_2^2$ and more particularly the angular accelerations $\omega_1^2 r_1$ and $\omega_2^2 r_2$. If the masses $m_1$ and $m_2$ are equal or very nearly equal, the difference (or gradient) in the forces $F_1$ and $F_2$ is attributable to the angular acceleration of the masses $m_1$ and $m_2$ (caused by the differing radiuses) which then serves as a proxy measure of the angular acceleration.

There are several ways known in the art to decouple a gravity gradiometer from angular acceleration and rotation of the platform to which the gradiometer is attached. The gradiometer may be placed in a mounting capable of three axis, free rotation with the axes of rotation passing as nearly as possible through the center of gravity of the gradiometer, and with the center of gravity of the platform collocated with that of the gradiometer (or as closely collocated as possible).

The three axis, freely rotating mounting can take several forms. The first and perhaps most obvious is the classic, three axis, gimbaled mount. One means of mounting is by the use of bearings. In this configuration, it is desirable that the bearings have low drag and the smallest possible hysteresis. High quality roller bearings or journal bearings can be used but are not necessarily preferred. As mentioned above, classic gimbaled mounts have limitations relative to noise and ranges of motion. In addition, they tend to introduce local gradients that change with the relative position of the gimbaled arms.

As an example, U.S. Pat. No. 5,668,315 ("the '315 patent") mentions the use of a gimbaled suspension and stabilization system to isolate a gravity gradiometer from rotation in part by using a three axis gimbaled mounting. The '315 patent discusses the importance of having the center of rotation of the gradiometer passing through the center of gravity of the gradiometer. The co-location of the centers of gravity and rotation of the gradiometer reduces the effects of pendulum oscillations. Additionally, to be fully effective, the center of gravity of the gradiometer (that portion inside the gimbaled mounting) should coincide with the center of rotation. If this condition is not met, it is of limited value to have the center of gravity of the sensor element correspond with the center of rotation. This is an issue since while it is always possible to have the center of gravity of the platform located at the center of rotation, with multiple sensor elements on the same platform, only one of the sensor elements can be at the center of rotation.

However, the use of gimbals in connection with gravity gradiometers presents some problems. For example, classic gimbals that use either bearings or suspension wires have certain intrinsic limits including ranges of motion and noise. The need to power the gradiometer and to provide signal paths to the gradiometer further restricts the range of motion and tends to mandate active control of orientation. Moreover, gimbaled systems tend to be heavy and bulky, and tend to use space inefficiently. All of these are significant disadvantages in gradiometer systems.

There is further a sensitivity tradeoff that occurs with gravity gradiometers. On the one hand, the gradiometer's sensitivity increases as the baseline is increased. On the other hand, sensitivity to angular acceleration noise also increases as the baseline is increased. Once the angular acceleration noise increases to the point that it exceeds the basic sensitivity of the gravity measurements, an increased baseline ceases to increase the gradiometer's sensitivity.

As has been pointed out, gravity gradiometers are sensitive to angular acceleration and rotation. Nevertheless, gravity gradiometers are typically treated as if they are insensitive to acceleration. While this is true to first order, there are vibrational modes that can couple to the gradiometer, such as in a gravity gradiometer that consists of two proof masses coupled together with a spring. The gravity gradient is measured by measuring the separation of the proof masses. If the proof masses are mounted in such a way that a bending moment is transferred to the proof masses, flexure may cause the proof masses to move together and apart in synchronization with the flexure. The flexure movement is non-linear along the axis of the gradiometer so a rectification can occur.

SUMMARY

An apparatus for maintaining the orientation of an instrument or other object in one embodiment includes an inner shell of ferromagnetic material. An outer shell surrounds the inner shell, and one or more electromagnets are attached to the inner surface of said outer shell. The powering of the electromagnets creates eddy currents in the inner shell, which create torques that orient and re-orient the position of the inner shell. In another embodiment, the outer shell has a plurality of ports that are supplied with a gas. Some ports function to levitate the inner shell, and other ports function to orient and re-orient the inner shell.

DETAILED DESCRIPTION

Figure 1:
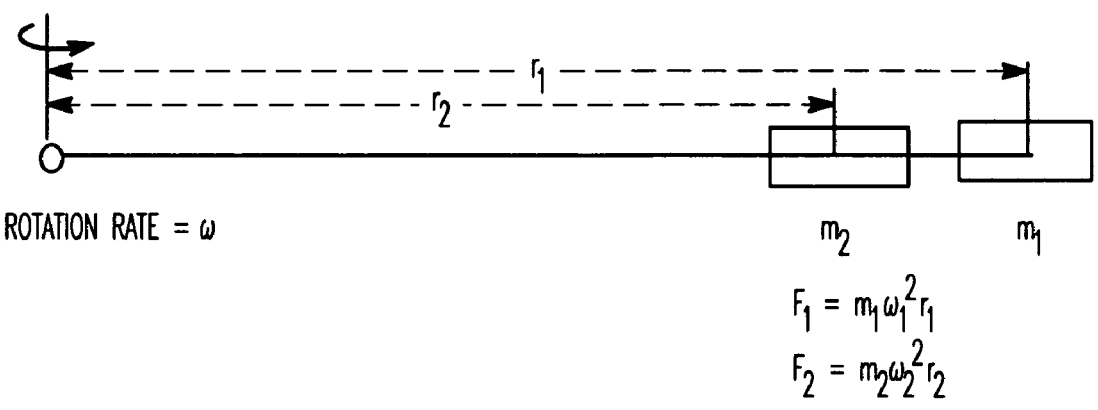
FIG. 1 illustrates the dependence of force on mass, rotation rate, and radius.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
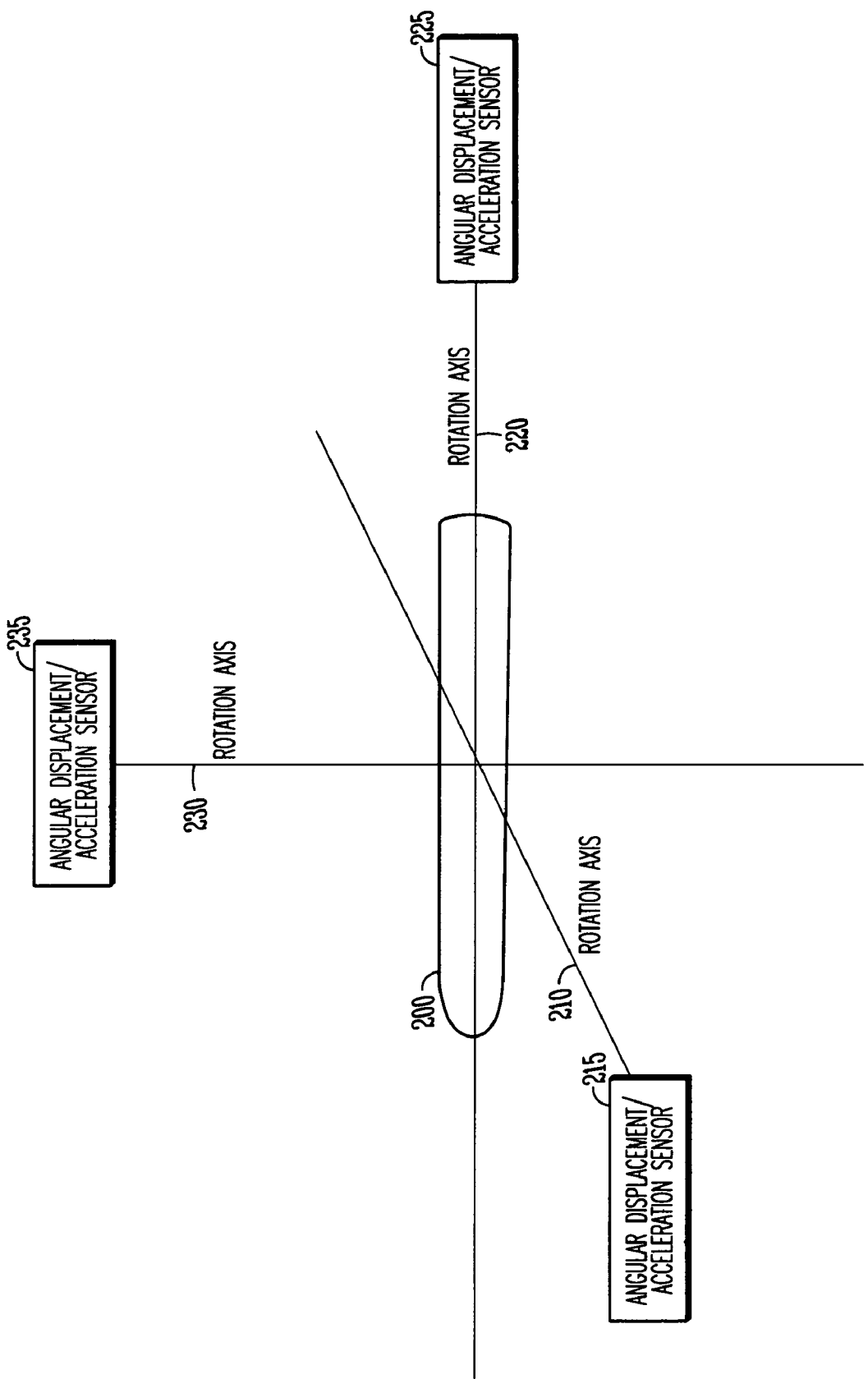
FIG. 2 illustrates an example embodiment of a three axis gradiometer.

FIG. 2 illustrates a gradiometer 200 having a first axis of rotation 210, a second axis of rotation 220, and a third axis of rotation 230. Angular acceleration/displacement sensors 215, 225, and 235 are placed along the axes of rotation 210, 220, 230 at equal distances from the center of rotation and gravity of the gradiometer 200. The sensors 215, 225, and 235 are mounted on a platform of the gradiometer (not shown in FIG. 2). A goal of the gradiometer of FIG. 2 is to maintain the gradiometer oriented in its original or reference position so that it is not-re-oriented as the vehicle to which the platform is mounted moves through space. Therefore, embodiments include three axis gradiometers as illustrated in FIG. 2 that are positioned within a freely rotating mounting. In one embodiment, the freely rotating mounting is a spherical shell. The actual mounting of the gradiometer to the spherical shell may be accomplished in several different ways to provide free rotation about any axis.

Figure 3:
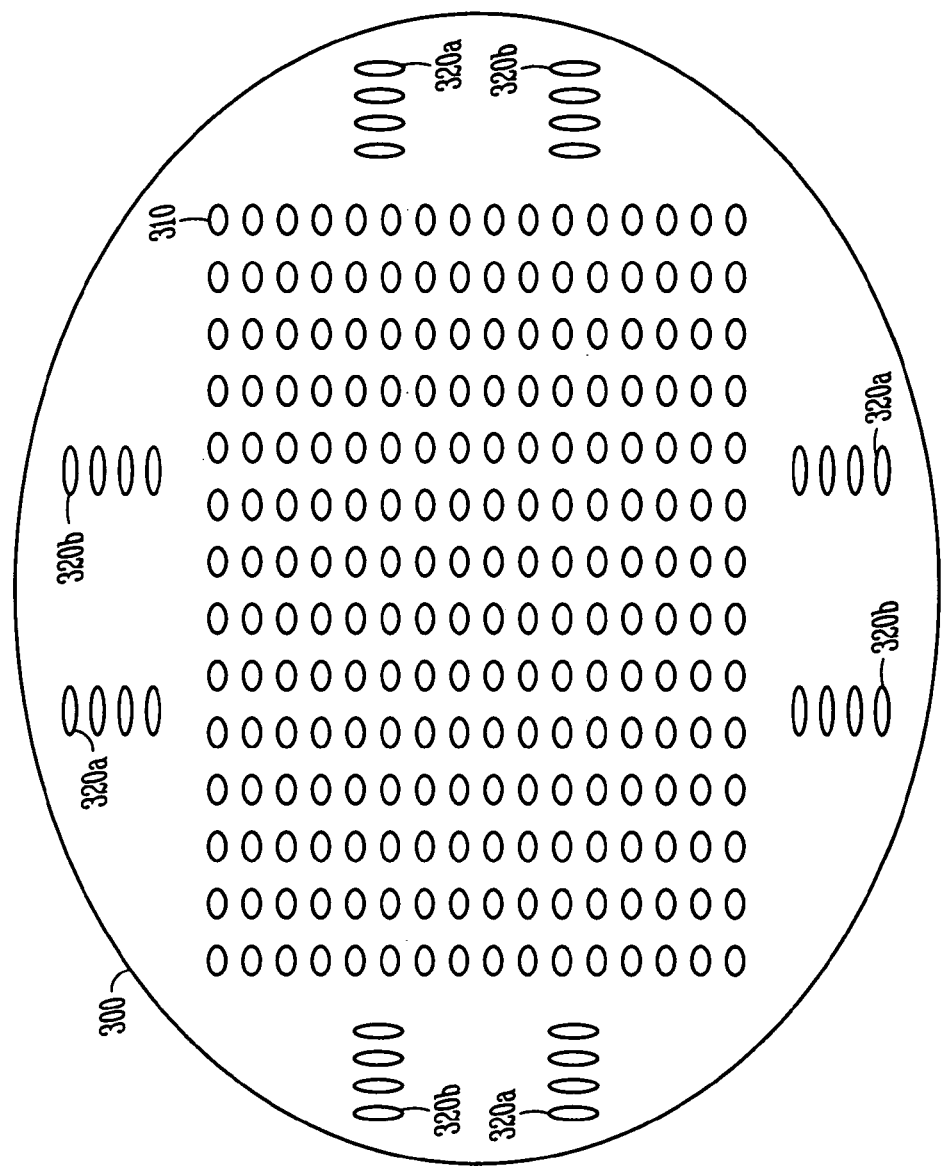
FIG. 3 illustrates an example embodiment of a shell that may be used to control and maintain the orientation of an object within the shell.

FIG. 3 illustrates an embodiment in which the gradiometer, scientific instrument, measuring instrument, or other object is placed inside a close fitting, perforated spherical shell. In FIG. 3, a shell 300 contains a gradiometer (not shown in FIG. 3). The outer shell 300 has load bearing ports 310 and canted ports 320a and 320b. The load bearing ports 310 are oriented substantially perpendicular to the gradiometer or other object contained within the outer shell 300. The ports 320a are canted in a first non-normal direction relative to the gradiometer, and the ports 320b are canted in a second non-normal direction relative to the gradiometer. In an embodiment, the shell 300 is attached to a vehicle or some other body. Air, or some other gas, is injected through the load bearing ports 310, and the gas levitates the gradiometer within the shell 300 (much in the same manner as a puck on an air hockey table). Angular displacement and acceleration sensors (not visible in FIG. 3) placed on the shell 300 sense displacements of the vehicle. The sensors are connected to the source of the gas for the canted ports 320a and 320b, and through a feedback mechanism, the sensors determine the ports to supply with the gas, and the pressure, volume, and/or velocity of that gas supply so as to control and maintain orientation of the gradiometer or other object. In an embodiment, this feedback control is implemented by a processor that couples the displacement and acceleration sensors and the gas supplies to the canted ports 320a, 320b. By supplying one of the ports 320a with gas, the gradiometer can be moved in a first direction (e.g., clockwise). By supplying the port 320b with gas, the gradiometer can be caused to move in a different direction (e.g., counter clockwise). Any combination of canted ports 320a, 320b can be supplied with gas to move the gradiometer along a first axis, an orthogonal second axis, an orthogonal third axis, or any intermediate direction among the axes. The arrangement of load bearing ports 310 and canted ports 320a, 320b illustrated in FIG. 3 is just an example embodiment, and those of skill in the art would be able to design other port arrangements to implement the stabilization of a gradiometer or other object. In the embodiment of FIG. 3, the use of a spherical shell has the advantage of providing a certain amount of ambient sound isolation.

Figure 4:
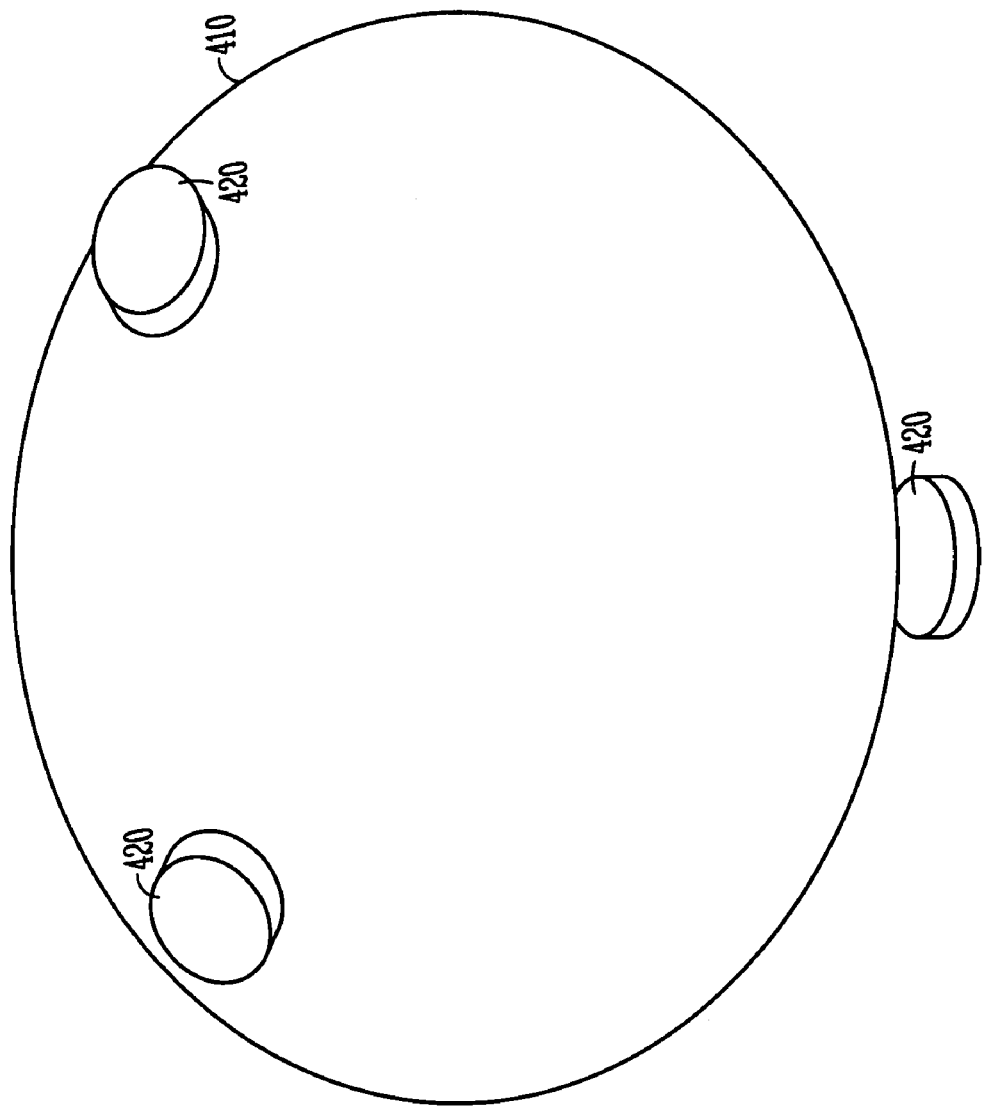
FIG. 4 illustrates another example embodiment of a shell that may be used to control and maintain the orientation of an object within the shell.
Figure 5:
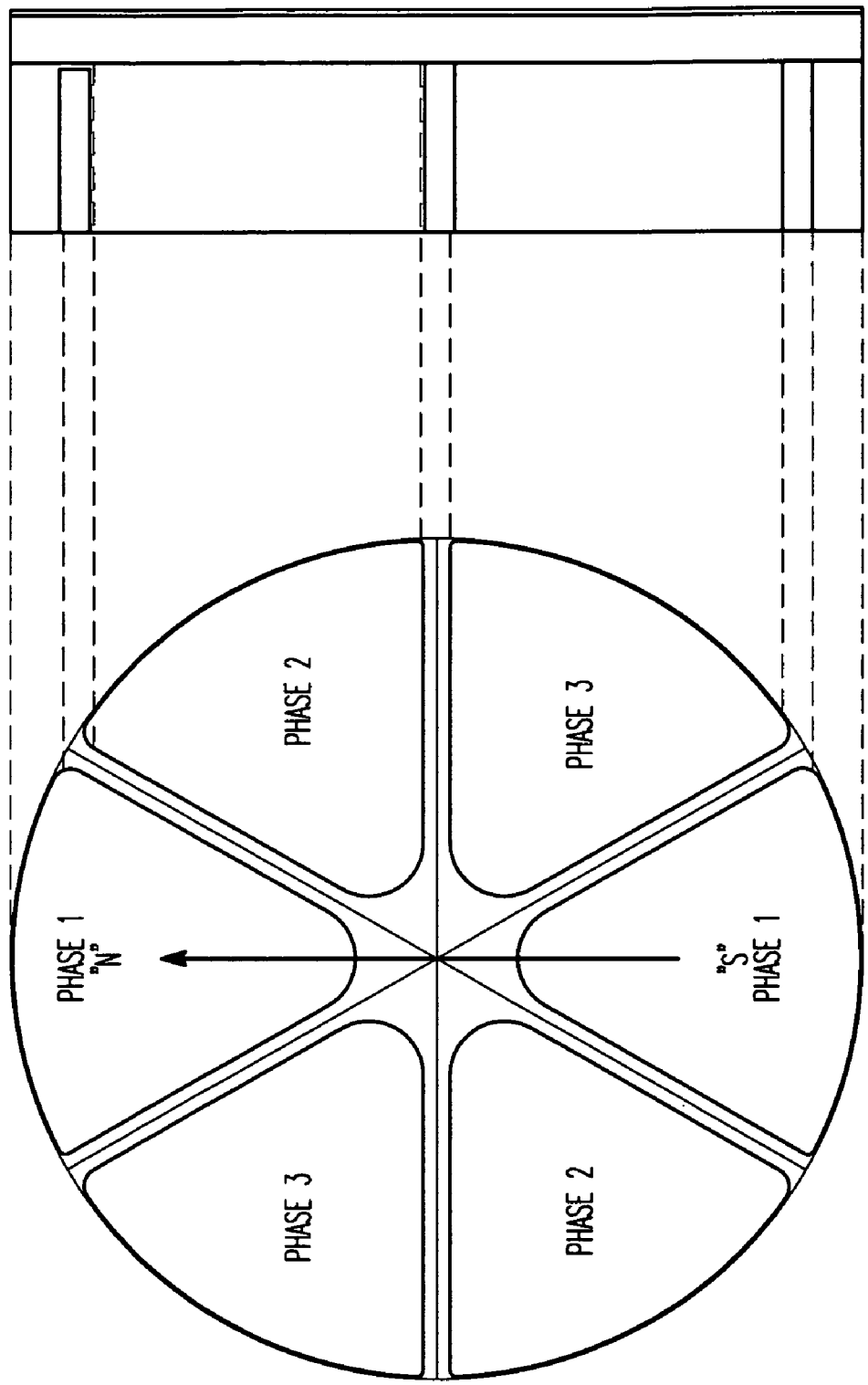
FIG. 5 illustrates an example embodiment of a six pole, three phase magnetic rotation actuator.

FIG. 4 illustrates another embodiment capable of suspending and stabilizing a gradiometer, scientific instrument, or other object within an outer sphere. The embodiment of FIG. 4 may be referred to as a magnetic gimbaled mounting. FIG. 4 illustrates an inner sphere 410 which contains a gradiometer (not shown in FIG. 4) mounted to the inside of the sphere 410. In an embodiment, the sphere 410 could itself be the gradiometer. In another embodiment, the spherical shell 410 is constructed of a ferromagnetic material. An outer shell (not shown in FIG. 4) has attached to its inner wall electromagnets 420. The electromagnets 420 are connected to a magnetic rotation actuator. An example embodiment of such a magnetic rotation actuator is illustrated in FIG. 5. The electromagnetic actuator and the electromagnets 420 produce a rotating magnetic field, and the electromagnetic field acting on the ferromagnetic inner shell 410 creates eddy currents within the shell 410. The eddy currents produce a torque on the inner shell 412, and the torque can orient and re-orient the shell 410 in any direction.

Figure 6:
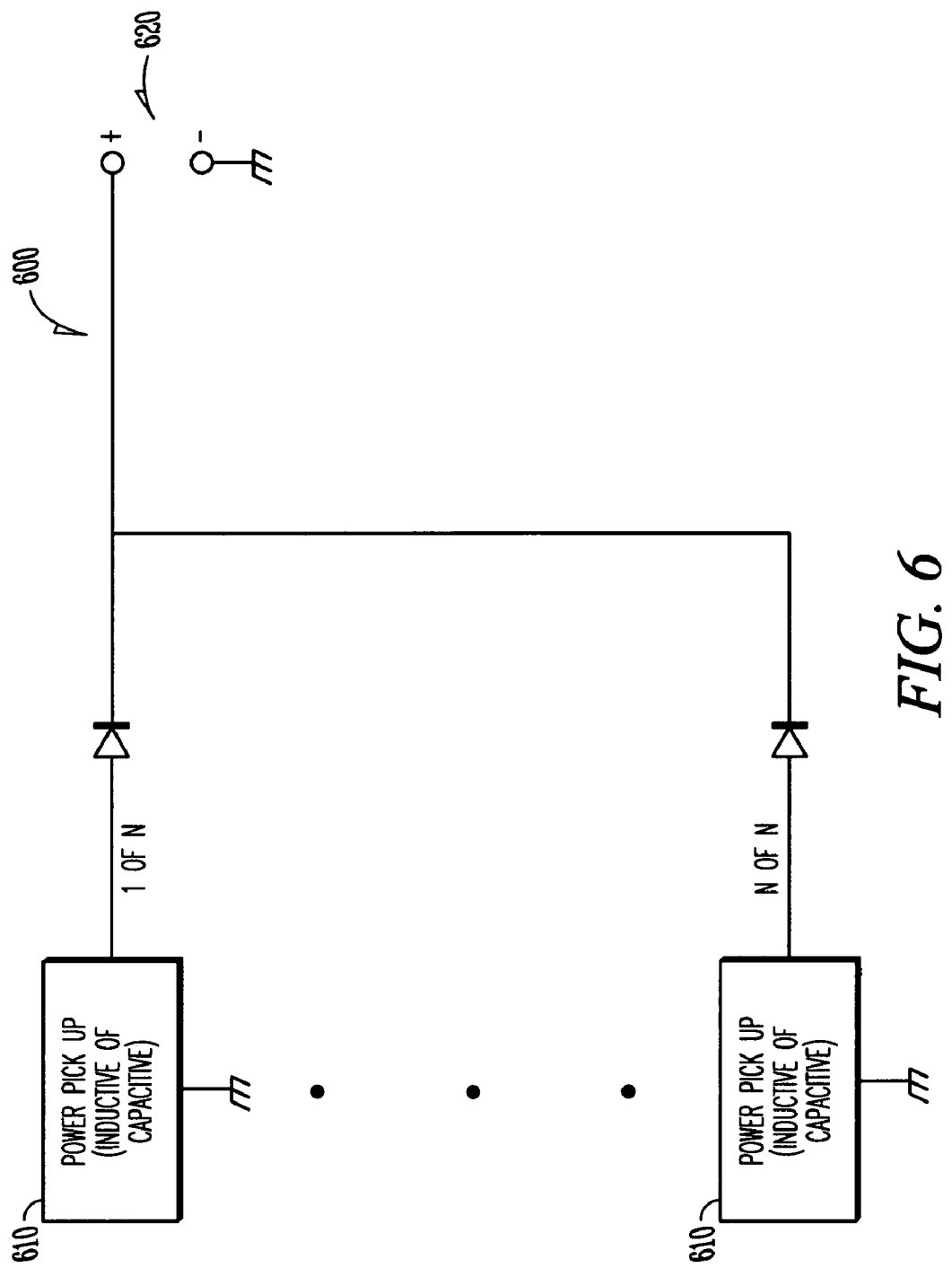
FIG. 6 illustrates an example embodiment of power source and a power pick up for that source.

FIG. 6 illustrates an embodiment of an inductive or capacitive power supply system that may be used in conjunction with various embodiments. Such a power supply system may be useful because a gradiometer or other object, or an inner shell containing a gradiometer or other object, is freely rotating—i.e., there are no physical links from the outer shell to the inner shell. In an embodiment, this link is an optical or RF link. An internal battery pack, optical, RF, or inductively coupled power supply can be used to power the gradiometer or other object. The capacitive or inductive power coupling can be used to assist in suspending the inner shell in addition to its primary function of powering the gradiometer or other instrument. In order to preserve the free rotation of the sphere, multiple power pickups may be provided that cover the surface of the sphere. Referring again to FIG. 6, a power system 600 is illustrated in which a plurality of inductive or capacitive pickups 610 located within the inner shell are coupled to a power source 620 on the outer shell. This placement of power source 620 and pick-ups 610 distributed around and on the sphere ensure power at all times and all orientations of the outer shell to the inner shell.

Figure 8A:
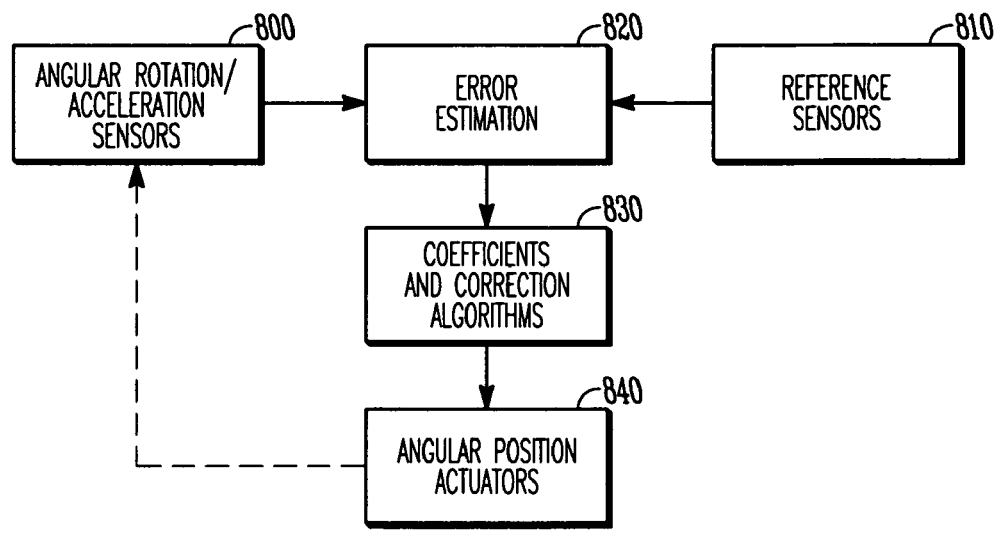
FIGS. 8A and 8B illustrate block diagrams of example embodiments of active orientation control.

FIG. 8A is a block diagram illustrating in an example embodiment the components of orienting and re-orienting a gradiometer or other object positioned in a sphere or other platform. The embodiment of FIG. 8A includes angular rotation and acceleration sensors at 800, and reference sensors at 810. The reference sensors 810 provide a baseline for the rotation and acceleration measurements. An error estimation module 820 receives input from both the rotation and acceleration sensors 800 and the reference sensors 810. Any error determined by the error estimation module 820 is compensated for by calculations in the coefficient and correction algorithm module 830, which sends a signal to the actuators 840 to correct for the detected rotation and acceleration. The actuators may be the ports of the embodiment of FIG. 3, the magnetic actuators of the embodiment of FIG. 4, a combination embodiment of FIGS. 3 and 4, and equivalents of FIGS. 3 and 4.

Figure 7A:
FIGS. 7A and 7B illustrate embodiments of a gradiometer having strain and/or flexure sensors and cancellation actuators attached thereto.
Figure 7B:
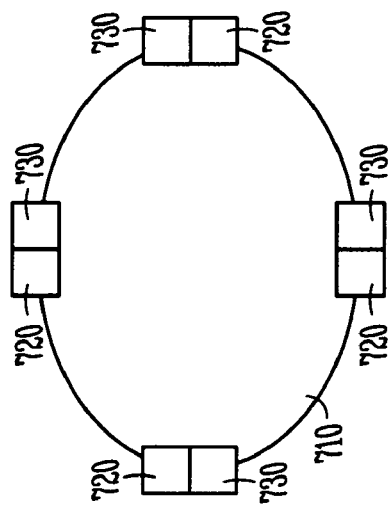
Figure 8B:
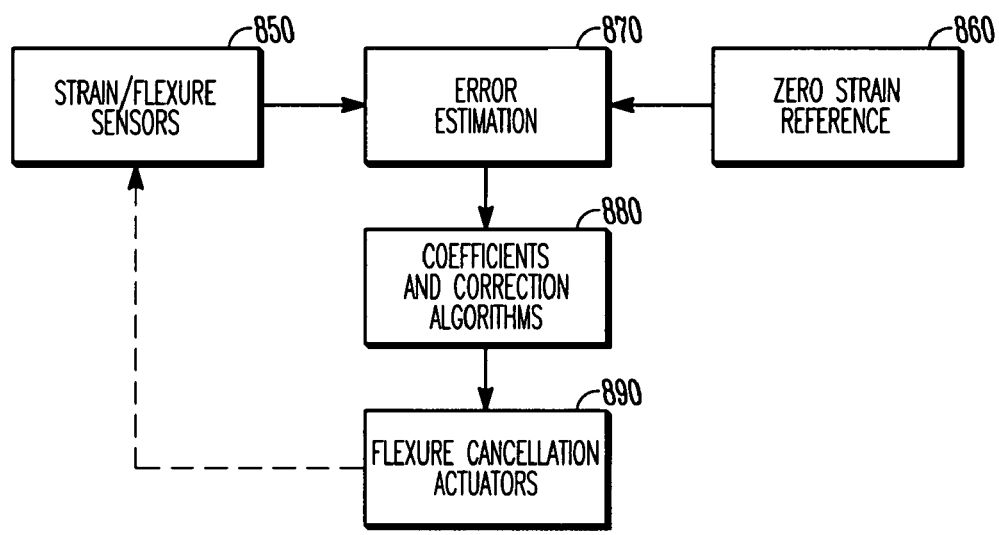

Similarly, FIG. 8B is a block diagram illustrating an example embodiment of components that may compensate for strain and flexure in a gradiometer or other object positioned in a sphere or other platform. The embodiment of FIG. 8B includes strain and flexure sensors at 850, and zero strain reference sensors at 860. The reference sensors 860 provide a baseline for the strain and flexure measurements. An error estimation module 870 receives input from both the strain and flexure sensors 800 and the reference sensors 860. Any error determined by the error estimation module 870 is compensated for by calculations in the coefficient and correction algorithm module 880, which sends a signal to the actuators 890 to correct for the detected strain and flexing of the gradiometer or other object. The actuators may be of the form as illustrated in FIG. 7. The embodiments of FIGS. 8A and 8B may be referred to as an active orientation controls.

Figure 9A:
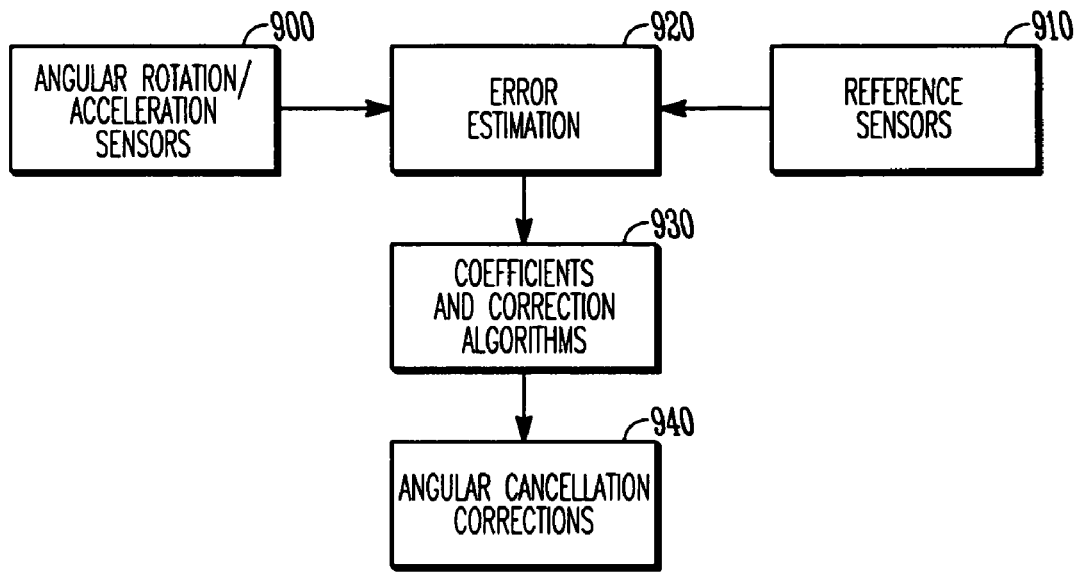
FIGS. 9A and 9B illustrate block diagrams of example embodiments of passive orientation control.
Figure 9B:
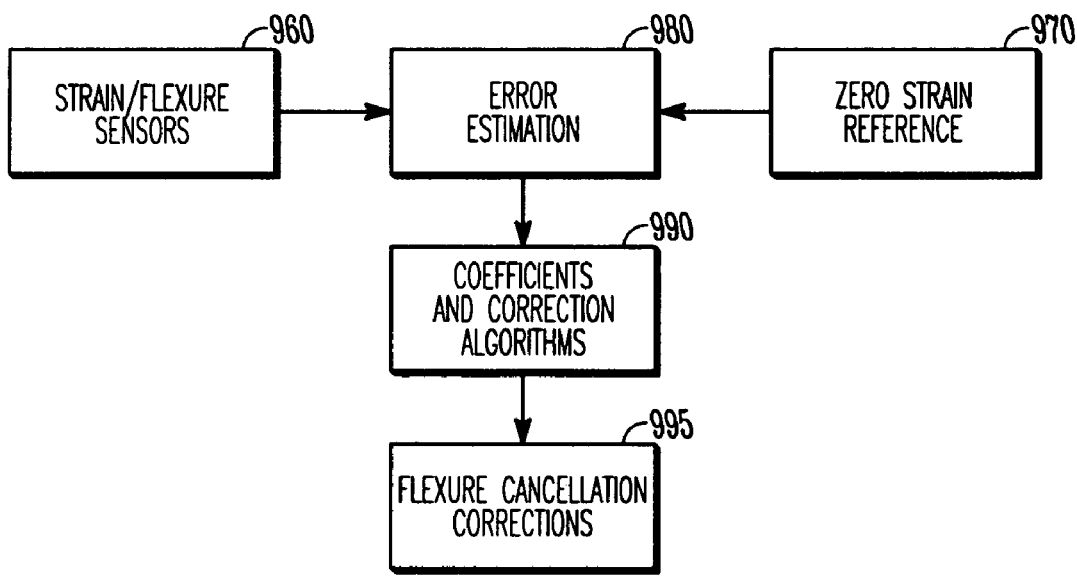

In another embodiment, a passive, rather than an active, orientation control is implemented. Such a passive orientation control is illustrated in FIGS. 9A and 9B. Referring to FIG. 9A, angular rotation and acceleration sensors 900 and reference sensors 910 provide input to error estimation module 920. The error calculated in the error estimation module 920 is then used in the coefficients and corrections algorithm module 930. The algorithm module 930 angular cancellation corrections 940. The angular cancellation corrections 940 are used to modify readings of a gradiometer to correct for acceleration and rotation. That is, the correction is not done physically with actuators, but mathematically to the gradiometer output.

Similarly, FIG. 9B illustrates a passive system to compensate for strain and flexure. In FIG. 9B, strain and flexure sensors 960 and reference sensors 970 provide input to error estimation module 980. The error calculated in the error estimation module 980 is then used in the coefficients and corrections algorithm module 990. The algorithm module 980 generates flexure cancellation corrections 995. The flexure cancellation corrections 995 are used to modify readings of a gradiometer to correct for strain and flexure forces on the gradiometer. That is, the correction is not done physically with actuators, but mathematically to the gradiometer output.

In a further embodiment, classical sound and vibration techniques may be used to reduce the gradiometer noise. Ambient noise may affect gravity gradiometers even when the noise is several orders of magnitude higher in frequency than the upper band edge of the gradiometer. In addition to the previously mentioned flexure modes, aliasing of high frequencies during the digitization process can result in in-band noise. This suggests that the overall sound and vibration reduction will be beneficial. Particular emphasis should be placed on reduction of bands that contain platform and sensor resonances.

In addition to using sound and vibration isolation, active noise compensation is possible for lateral modes. This can be accomplished by installing strain sensors on the gradiometer. An example embodiment of such strain sensors positioned on a gradiometer is illustrated in FIGS. 7A and 7B. FIG. 7A shows a side view of a gradiometer 710. Attached to the gradiometer 710 at various points are strain/flexure sensors 720, and strain/flexure cancellation actuators 730. In an embodiment, the actuators and sensors are piezoelectric crystals. When the sensor 720 senses a strain (compressive or expansive) or a flexure, a signal is sent to a processor, which in turn sends a signal to the actuator to compensate for and thereby cancel the strain or flexing of the gradiometer. This is particularly important when the gradiometer is measuring a proxy of the gradient, such as the first derivative, and the $\Delta x$ in the derivation must be kept constant or very nearly constant. The output of the strain or flexure sensors can then be used to compensate for strain-induced, gradiometer noise. In an embodiment, two strain or flexure components should be measured by placing two sensors 90 degrees apart relative to each other.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. An apparatus comprising:
an inner shell comprising a ferromagnetic material;
an outer shell surrounding said inner shell;
one or more electromagnets attached to the inner surface of said outer shell;
a displacement sensor attached to said inner shell; and
an acceleration sensor attached to said inner shell.

2. The apparatus of claim 1, further comprising a measuring instrument attached to an inner surface of said inner shell.

3. The apparatus of claim 2, wherein said measuring instrument comprises a gradiometer.

4. The apparatus of claim 3, wherein said one or more electromagnets are configured to create eddy currents in said inner shell.

5. The apparatus of claim 4, further comprising a magnetic rotation actuator coupled to said electromagnets.

6. The apparatus of claim 4, wherein torques created by said eddy currents orient said inner shell.

7. The apparatus of claim 6, further comprising:
a strain sensor attached to said gradiometer; and
a strain cancellation actuator attached to said gradiometer.

8. The apparatus of claim 7, wherein said apparatus is configured to use an output from one or more of said displacement sensor, said acceleration sensor, and said strain sensor to mathematically correct for one or more of a displacement of, an acceleration of, and a strain on said gradiometer.

9. The apparatus of claim 7, wherein said apparatus is configured to use an output from one or more of said displacement sensor, said acceleration sensor, and said strain sensor to determine a power level to supply to said magnetic rotation actuator, said electromagnets, and said strain cancellation actuator, thereby controlling the magnitude of the torques created by said eddy currents.

10. The apparatus of claim 1, wherein said inner shell comprises a gradiometer.

11. The apparatus of claim 1, further comprising:
a power source attached to said outer shell; and
a power pickup attached to said inner shell.

12. The apparatus of claim 11, wherein said power source and said power pickup include one or more of a capacitive power source, a capacitive power pickup, an inductive power source, and an inductive power pickup.

13. The apparatus of claim 1, wherein said inner shell and said outer shell are substantially spherical.

14. An apparatus comprising:
an inner shell;
an outer shell enclosing said inner shell;
a plurality of first ports in said outer shell, said plurality of first ports oriented at a first non-normal angle to a surface of said inner shell;
a plurality of second ports in said outer shell, said plurality of second ports oriented at a second non-normal angle to said surface of said inner shell;
a plurality of third ports in said outer shell, said plurality of third ports substantially oriented at a normal angle to the surface of said inner shell;
a displacement sensor attached to said inner shell; and
an acceleration sensor attached to said inner shell.

15. The apparatus of claim 14, further comprising a supply of gas connected to said first ports, said second ports, and said third ports.

16. The apparatus of claim 15, further comprising a processor to control the flow of said gas to at least said first ports and said second ports.

17. The apparatus of claim 16, wherein said processor is configurable to provide said gas at a first pressure to said first ports and to provide said gas at a second pressure to said second ports.

18. The apparatus of claim 14, further comprising:
a power source attached to said outer shell; and
a power pickup attached to said inner shell.

19. The apparatus of claim 14, further comprising a measuring instrument positioned inside said inner shell.

20. The apparatus of claim 19, wherein said measuring instrument is a gradiometer.

21. The apparatus of claim 20, further comprising:
a strain sensor attached to said gradiometer; and
a strain actuator attached to said gradiometer.

22. The apparatus of claim 21, wherein said apparatus is configured to use an output from one or more of said displacement sensor, said acceleration sensor, and said strain sensor to mathematically correct for one or more of a displacement of, an acceleration of, and a strain on said gradiometer.

23. The apparatus of claim 21, wherein said apparatus is configured to use an output from one or more of said displacement sensor, said acceleration sensor, and said strain sensor to determine a pressure to be supplied to each of said first ports and said second ports.

24. The apparatus of claim 14, wherein said inner shell comprises a gradiometer.

25. An apparatus comprising:
an inner shell;
an outer shell enclosing said inner shell;
a measuring instrument attached to the inside surface of said inner shell;
a displacement sensor attached to said inner shell;
an acceleration sensor attached to said inner shell; and
means to maintain said inner shell in a first orientation.

26. The apparatus of claim 25, wherein said measuring instrument comprises a gradiometer.

* * * * *